Figures 1, 2:
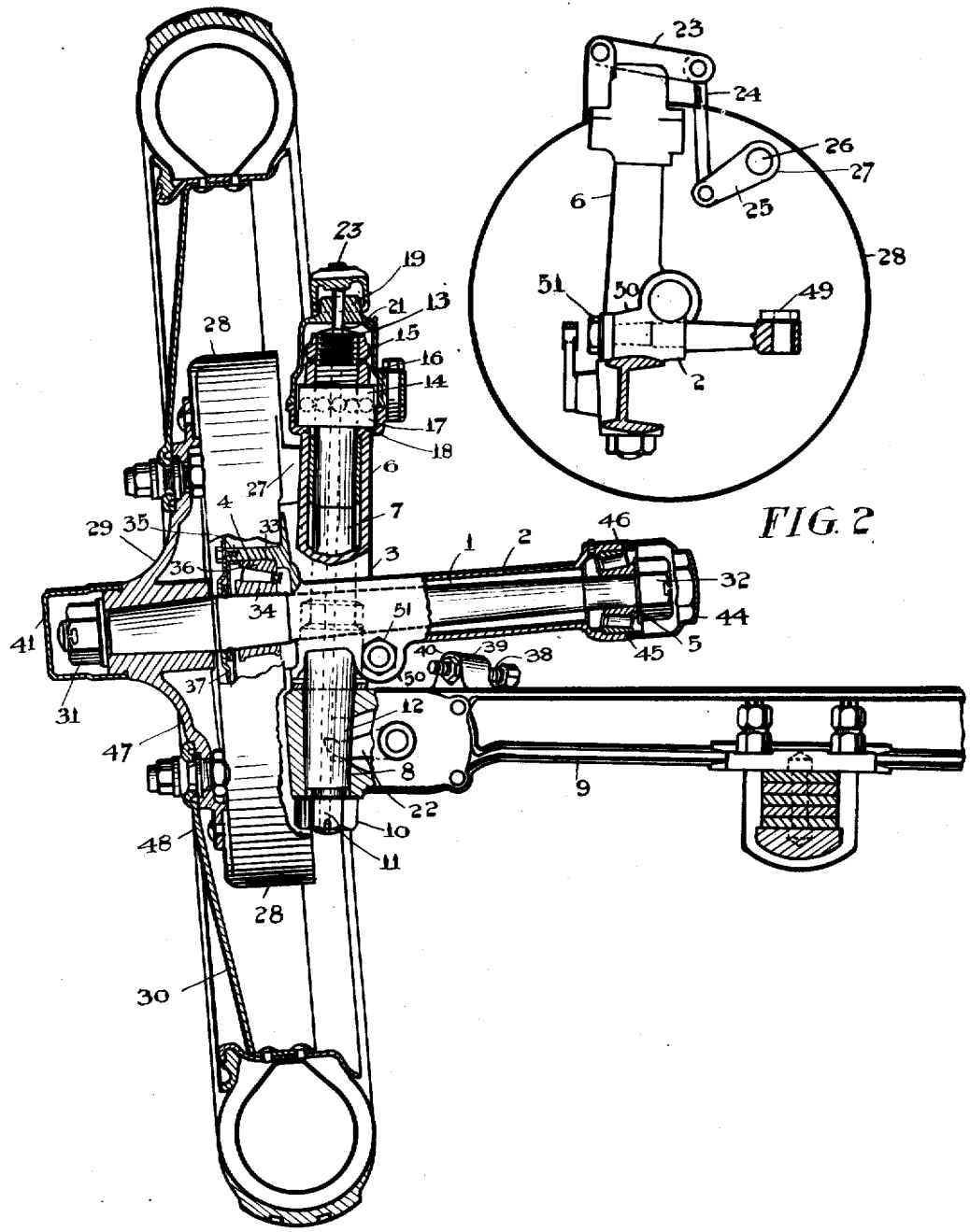

Patented May 13, 1924.

1,493,683

UNITED STATES PATENT OFFICE.

ALPHONSE JOSEPH LAVOIE, OF MONTREAL, QUEBEC, CANADA.

FRONT-AXLE MECHANISM.

Application filed November 30, 1921, Serial No. 518,748. Renewed October 8, 1923.

*To all whom it may concern:*

Be it known that I, ALPHONSE JOSEPH LAVOIE, a subject of the King of Great Britain, and residing at the city of Montreal, in the Province of Quebec, in the Dominion of Canada, have invented a new and useful Front-Axle Mechanism, of which the following is the specification.

The invention relates to front axle mechanism as described in the present specification and illustrated in the accompanying drawings that form part of the same.

The invention consists essentially of the novel features of construction pointed out broadly and specifically in the claims for novelty following a description in detail of the preferred form of the invention.

The objects of the invention are to construct the parts incidental to the mounting of the vehicle frame on the wheels in such a manner as will insure free manipulation of the wheels for steering purposes and great stability in the structure; and generally to provide a durable and flexible mechanism for mounting the vehicle frame and body on the front wheel.

In the drawings, Figure 1 is a vertical sectional view of the steering knuckle in the front axle mechanism and contiguous parts.

Figure 2 is an inside elevation of the main parts to the invention.

Like numerals of reference indicate corresponding parts in the various figures.

The rotating axle shaft 1 projects inwardly into the housing 2 forming part of the steering knuckle 3 and the bearings 4 and 5 are arranged in said housing 2. The pivot housing 6 is the vertical section of the knuckle 3. The pivot 7 is rigidly set in the tapered socket 8 in the stationary axle 9 and securely held by the nut 10, said pivot having a rod hole 11 therethrough from the slot 12 near the lower end out through the upper end 13 which is threaded and below said thread provided with one member 14 of a ball race securely held thereon by the nuts 15 and 16, the opposing member 17 being supported on the shoulder 18 in the upper part of the housing 6.

The cap 19 closes in the upper end 13 of the pivot 7 including the nuts 15 and 16 and the ball race and the balls 20 forming the bearings.

The rod 21 shown in the drawings is part of the brake operating mechanism and is actuated by the bell crank lever 22 and at its upper end is operatively connected to the pivoted arm 23 supported by the cap 19. The arm 23 is joined by the link 24 to the crank 25 on the shaft 26, which extends into the brake mechanism at 27. These parts are only incidental to the front axle mechanism and specifically form part of the brakes and operating parts though they occur in this invention in the construction.

It will be seen that in this construction the rotating axle is projected inwardly, thereby giving it a long swinging bearing.

The brake drum 28 may be omitted, where it is not found desirable to brake the front wheels and in that case the steering knuckle pivotally supports the rotating axle shaft, and the said axle shaft is in turn supported by the wheel.

In omitting the front wheel brakes the pivot 7 need not have a rod hole.

The rotating axle shaft 1 is held fast with the hub 29 of the wheel 30 by the nut 31, the nut 32 at the other end forming a retainer for the roller bearings 5, the roller bearings 4 with the bushings 33 and 34 being encased in the central bearing wall 35 forming a bearing recess 36 at the outer end of the axle shaft housing 2, said recess being closed in the plate 37 suitably packed and bolted.

The stop pins 38 are screw threaded into and through the lugs 39 and locked by the nuts 40 and are arranged and adjusted to meet the steering knuckle at the extremity of each swing and thereby limit the turning of the wheel in either direction.

The cap 41 is screwed on to the hub 29 over the nut 31 and encloses said nut, the axle end and the end of the hub.

The same form of cap is shown at the inner end of the housing in which the cap 44 screws on to the housing 2 and is formed with a bead 45 snapping into the groove 46.

The hub 29 is formed with an extension disc centre 47 to which wheel centre 48 is attached and where the brakes are used for the front wheels the brake drums 28 are also attached to the disc centres 47.

49 is one of the operating rods secured by the nut 51 in a lug extension 50 from the knuckle.

In the operation of this mechanism the steering knuckles are turned by a wheel usually connected up by gearing to the rod connecting the two front axle mechanisms, that is to say, the operating rods 49 are connected and actuated by a wheel and its connections and one rod 49 shoved forward while the other is pulled back, thereby turning the wheels for the purpose of guiding the vehicle to the left or to the right or straight ahead.

In swinging the steering knuckles they turn freely on the stationary pivots from the permanent front axle or transverse beam of the vehicle frame and as the rotating axle shafts are really a part of the knuckle mechanisms, the wheels must turn with any movement of said knuckles. The movement is very easy on account of the ball bearing pivot mounting and suspension of the mechanism from above the stationary axle is a very salient feature of the construction, especially in the view of the freedom from dirt and the long distance between the bearing supports.

What I claim is:

1. In front axle mechanism, an axle rigid with the vehicle frame, a vertical pivot pin secured in said axle and projecting thereabove, a housing for the pivot pin, rotatable axle and axle bearing, an axle journalled in said axle housing and carrying a wheel at the outer end thereof and a bearing within said pin housing limiting the vertical movement of said housings.

2. In front axle mechanism, an axle rigid with the vehicle frame, a knuckle pivotally mounted on said axle and formed of an axle housing offset from a vertical pin housing, an axle in said axle housing carrying a wheel at the end thereof, a ball bearing supported in said pin housing and a pivot pin fixed in respect to one member of said ball bearing and fast in said axle and forming a pivot for said knuckle.

3. In front axle mechanism, an axle rigid with the vehicle frame, a knuckle having an axle housing and pin housing and pivotally secured to said rigid axle, an axle in said axle housing carrying a wheel, and a bearing support at the upper end of said pin housing, a bearing member mounted in said support, a pivot pin extending upwardly from said axle through said bearing member, an upper bearing member suitably mounted on said bearing member and held in position thereon and a cap on said pin housing.

4. In front axle mechanism, an axle rigid with the vehicle frame, a pin projecting upwardly from said axle, a knuckle having a vertical housing for said pin and an axle housing extending inwardly therefrom, a bearing formed of balls and rings, the latter forming the ball race and having one ring secured to the pin and the other to the housing, and a rotatable axle in said axle housing.

5. In front axle mechanism, an axle rigid with the vehicle frame, a pin projecting upwardly therefrom, a knuckle having a pin housing and an axle housing, a rotatable axle journalled at the inner end of said axle housing and intermediately thereof, a wheel mounted at the end of the rotatable axle, and a bearing in said pin housing having one member secured thereto and another member secured to the pin.

6. In front axle mechanism, an axle rigid with the vehicle frame and having a pin socket, a pin secured in said socket and having a threaded upper end, a knuckle mounted on said pin and having a pin housing and an axle housing, said pin housing having a shoulder forming a bearing support, a bearing formed of balls and rings, the latter forming the race and having one ring resting on said shoulder and the other bearing on the balls and encircling the pin, lock nuts mounted on said threaded upper end and engaging the upper bearing ring, a cap closing in said bearing and means for operating said knuckle.

Signed at Montreal Canada this 22nd day of November, 1921.

ALPHONSE JOSEPH LAVOIE.